United States Patent
Pedersen et al.

(10) Patent No.: US 12,496,014 B2
(45) Date of Patent: Dec. 16, 2025

(54) OPTIMIZING POSITIONING AND CONFIGURATION OF A HEARING DEVICE

(71) Applicant: Oticon A/S, Smørum (DK)

(72) Inventors: Michael Syskind Pedersen, Smørum (DK); Karsten Bo Rasmussen, Birkerød (DK); Anders Højsgaard Thomsen, Smørum (DK); Fares El-Azm, Smørum (DK); Anders Vinther Olsen, Frederiksberg (DK)

(73) Assignee: Oticon A/S, Smørum (DK)

( * ) Notice: Subject to any disclaimer, the term of this patent is extended or adjusted under 35 U.S.C. 154(b) by 253 days.

(21) Appl. No.: 18/482,915

(22) Filed: Oct. 9, 2023

(65) Prior Publication Data
US 2024/0122543 A1    Apr. 18, 2024

(30) Foreign Application Priority Data

Oct. 11, 2022    (EP) .................................... 22200820

(51) Int. Cl.
*A61B 5/00* (2006.01)
*A61B 5/11* (2006.01)
*H04R 1/40* (2006.01)
*H04R 25/00* (2006.01)

(52) U.S. Cl.
CPC .......... *A61B 5/6815* (2013.01); *A61B 5/1121* (2013.01); *A61B 5/1123* (2013.01); *H04R 1/406* (2013.01); *H04R 25/407* (2013.01); *H04R 25/558* (2013.01); *A61B 2560/0223* (2013.01); *H04R 2225/41* (2013.01)

(58) Field of Classification Search
CPC ... A61B 5/6815; A61B 5/1121; A61B 5/1123; A61B 2560/0223; H04R 1/406; H04R 25/407; H04R 25/558; H04R 2225/41
See application file for complete search history.

(56) References Cited

U.S. PATENT DOCUMENTS 11,128,961 B2    9/2021    Pedersen et al.

FOREIGN PATENT DOCUMENTS

CN    112055975    12/2021
EP    3684079    7/2022

*Primary Examiner* — Mark Fischer

(57) ABSTRACT

Disclosed herein are embodiments of methods, in particular performed by at least one hearing device, uses of the method, hearing devices and hearing systems. The method can include determining a reference orientation and/or position, in particular a reference vector $u_{ref}$, of a hearing device; detecting at least one movement and/or acceleration of the hearing device; determining at least one deviating orientation and/or position, in particular at least one deviation vector $v_d$, of the hearing device based on the detected at least one movement and/or acceleration; and determining at least one deviation, in particular at least one deviation angle $\theta$, between the reference orientation and/or position, in particular the reference vector $u_{ref}$, and the at least one deviating orientation and/or position, in particular the at least one deviation vector $v_d$.

20 Claims, 6 Drawing Sheets

OPTIMIZING POSITIONING AND CONFIGURATION OF A HEARING DEVICE

FIELD

The present disclosure generally relates to a method, in particular performed by at least one hearing device, a use of the method, a hearing device, in particular a hearing aid, and a hearing system comprising a first and a second hearing device. The disclosure more particularly relates to a method for e.g. monitoring the wearing behavior of an individual user of a hearing device, a use of the method for optimizing positioning and/or configuration of a hearing device, a hearing device being configured to and/or comprising at least one means for performing the method and a hearing system comprising a first and a second hearing device being configured to and/or comprising at least one means for performing the method.

BACKGROUND

In the field of hearing devices, there is an increasing awareness towards individual adaptation of the hearing device settings in order to provide wearers with an optimum sound experience. All hearing device producers aim for providing hearing devices that fit well and that are capable of learning the user's individual preferences so that the hearing devices can deliver a just-right sound amplification.

Such optimization may be carried out by fitting the hearing device on the basis of a number of general and also individual parameters, however, some parameters are difficult to access and quantify. Parameters such as head movement of the user of the hearing device, e.g. during physical activity, may be of great importance. While the directional system of a hearing device often relies on the assumption that the microphones are located in the horizontal plane, for which the directional system has optimal conditions for its processing, it has previously been suggested to compensate for such a deviation in that the amount of dislocation is determined by an accelerometer and the directional system is modified in order to compensate for sub-optimal mounting.

From EP 2908550 B 1, such a hearing device is known which is provided with an accelerometer. If, e.g. during physical activity, the hearing device is arranged in a position in which the microphones are not arranged in the same horizontal plane, the accelerometer determines the direction of gravity g and the hearing device is configured to compensate for misalignment of the microphones by modifying the noise reduction system.

Nevertheless, such optimization may be insufficient, in particular, as individual parameters like every day wearing behavior are not taken into account. While, for example, a rather old person may sit quite bent during fitting of a hearing device by a hearing care professional (HCP), the same person might walk rather upright during daily use, e.g. when using walking aids such as a wheeled walker. Alternatively, the person may sit rather upright during fitting of a hearing device, but may walk quite bent during daily use. The fitted hearing device may then be worn in a sub-optimal way which may also lead to directional noise reduction working in a sub-optimal way.

Thus, the benefit of the hearing device may not be as high as it could have been, because e.g. wearing behavior during daily use is not taken into account.

Therefore, there is a need to provide a solution that addresses at least some of the above-mentioned problems.

SUMMARY

According to a first aspect, the method may comprise determining a reference orientation and/or position of a hearing device. Orientation of a hearing device may refer to the spatial directionality or alignment of the hearing device. Position of the hearing device may refer to the location of the hearing device. The term "orientation" may e.g. indicate a direction in a stationary coordinate system relative to the earth, or relative to a reference direction, e.g. a direction of the force of gravity, on a particular location on (the surface of) the earth. A "position" of a device may e.g. indicate a set of coordinates in a stationary coordinate system relative to the earth, e.g. the surface of the earth (e.g. GPS-coordinates). These quantities may be expressed in any coordinate system and by means of any unit e.g. the International System of Units (SI).

Determination of the reference orientation and/or position of the hearing device may be performed by the hearing device itself. For example, the hearing device may comprise at least one determination means for determining orientation and/or position of the hearing device, e.g. at least one sensor. The position, orientation, and/or acceleration of the sensor may be known and a reference orientation and/or position of the hearing device may be determined based on sensor data. Determination of the reference orientation and/or position of the hearing device may also be performed manually. For example, a reference orientation and/or position may be manually set by the user, the producer, or the HCP of the hearing device. The reference orientation and/or position of the hearing device may serve as a basis for determining deviations in orientation and/or position.

The hearing device settings, parameters, and/or configuration may be based on the reference orientation and/or position of the hearing device. In particular, the fit and functioning of the hearing device may work in the best possible way, when the hearing device is oriented and/positioned according to the reference orientation and/or position of the hearing device.

In particular, the method may comprise determining a reference vector u f of the hearing device. A vector, in particular reference vector $u_{ref}$, may be a quantity having direction as well as magnitude, especially determining the position of one point in space relative to another. The reference vector $u_{ref}$ may be determined as the vector between at least two reference points of the hearing device. In particular, the reference vector $u_{ref}$ may be determined as the vector between at least two reference points of the hearing device when the hearing device is oriented and/or positioned in a reference orientation and/or position. The reference vector $u_{ref}$ may also refer to the direction of gravity g of the earth. For example, a reference vector $u_{ref}$ may be defined as the acceleration vector measured by an accelerometer when a hearing aid's microphones are located in the same horizontal plane, and the accelerometer is mainly or solely affected by gravity.

The method may further comprise detecting at least one movement and/or acceleration of the hearing device. A movement may refer to a motion of the hearing device, in particular a change of position with respect to space and time. Acceleration may refer to the rate of change of the velocity of the hearing device with respect to time. Acceleration may be a vector quantity having a magnitude and direction. The term "movement and/or acceleration" may include both linear and angular position, velocity and acceleration. Thus, "movement and/or acceleration" may include position, orientation as well as the first and second derivative (e.g. with respect to time) of these. The method may comprise detecting a plurality of movements and/or accelerations of the hearing device during its wearing time. For example, head movements, e.g. a nod or rotation of the head to a side, or a combination thereof, may be detected. Detection may be performed by at least one detection means. The at least one detection means may e.g. be integrated in and/or attached to the hearing device.

The method may further comprise determining at least one deviating orientation and/or position of the hearing device based on the detected at least one movement and/or acceleration. The deviating orientation and/or position of the hearing device may refer to a current orientation and/or position of the hearing device. The current orientation and/or position of the hearing device may be determined based on a current movement and/or acceleration of the hearing device. The current orientation and/or position of the hearing device may differ from the reference orientation and/or position of the hearing device.

In particular, the method may comprise determining at least one deviation vector $v_d$ of the hearing device based on the detected at least one movement and/or acceleration. The deviation vector $v_d$ may differ from the reference vector $u_{ref}$ e.g. in direction and/or magnitude. The deviation vector $v_d$ may refer to a current vector, in particular a current acceleration vector (e.g. measured by an accelerometer), of the hearing device. The deviation vector $v_d$ may be determined as the vector between the same at least two reference points of the hearing device as for determining the reference vector $u_{ref}$. In particular, the deviation vector $v_d$ may be determined as the vector between at least two reference points of the hearing device when the hearing device is oriented and/or positioned in a deviating orientation and/or position.

The method may further comprise determining at least one deviation, in particular at least one deviation angle θ, between the reference orientation and/or position, in particular the reference vector $u_{ref}$, and the at least one deviating orientation and/or position, in particular the at least one deviation vector $v_d$. The deviation between the reference orientation and/or position and the at least one deviating orientation and/or position may be indicated by deviation angle θ. Deviation angle θ may be determined on the basis of reference vector $u_{ref}$ and deviation vector $v_d$.

The method according to the first aspect may be performed by at least one hearing device. A hearing device (or hearing instrument, hearing assistance device) may be or include a hearing aid, a listening device or an active ear-protection device that is adapted to improve, augment, and/or protect the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss.

A "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

In particular, the method according to the first aspect may be performed by at least one hearing aid. The hearing aid device may be any type of hearing aid device including a behind-the-ear (BTE) hearing aid, an in-the-ear (ITE) hearing aid, a completely-in-canal (CIC) hearing aid, an in-the-canal (ITC) hearing aid, a receiver-in-the-ear (RITE) hearing aid. The hearing aid device may comprise a BTE part (adapted for being located behind or at an ear of a user) operationally connected to a loudspeaker (receiver) and a microphone located in an ear canal of the user.

The hearing device may be adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a BTE type hearing aid, and/or ii) arranging the hearing device entirely or partly in the pinna and/or in the ear canal of the user such as in an ITE type hearing aid or ITC/CIC type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

In general, a hearing device may include i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

According to a second aspect, the method according to the first aspect may be used for optimizing positioning of a hearing device. In particular, the method may be used for optimizing orientation and/or position of the hearing device. For example, it may be found that a current orientation and/or position of the hearing device deviates from the reference orientation and/or position of the hearing device. In particular, it may be found that the actual orientation and/or position of the hearing device deviates from the reference orientation and/or position of the hearing device during most of the time of a day. This may allow for optimizing positioning of the hearing device, in particular for optimizing orientation and/or position of the hearing device. In particular, the user and/or the HCP of the hearing device may correct an initial positioning, e.g. an initial orientation and/or position, of the hearing device.

Alternatively, or additionally, the method according to the first aspect may be used for optimizing configuration of a hearing device. It may be found, e.g. based on the deviation in orientation and/or position of the hearing device, that the configuration of the hearing device may be suboptimal for a user. In particular, the method may be used for determining the optimum length of a connecting part, in particular a receiver tube or wire, of the hearing device. For example, in the case of a BTE hearing aid, it may be found that the receiver tube or wire length is suboptimal for an individual user. In particular, it may be suggested to the user to change the receiver tube or wire length to achieve a more optimal position of the hearing device.

According to a third aspect, a hearing device may be configured to performing a method according to the first aspect. In particular, the hearing device may at least be configured to determine a reference orientation and/or position, in particular a reference vector $u_{ref}$, of the hearing device; detect at least one movement and/or acceleration of the hearing device; determine at least one deviating orientation and/or position, in particular at least one deviation vector $v_d$, of the hearing device based on the detected at least one movement and/or acceleration; and/or determine at least one deviation, in particular at least one deviation angle $\theta$, between the reference orientation and/or position, in particular the reference vector $u_{ref}$, and the at least one deviating orientation and/or position, in particular the at least one deviation vector $v_d$.

Alternatively, or additionally, a hearing device may comprise at least one means for performing a method according to the first aspect. In particular, the hearing device may comprise at least one means to determine a reference orientation and/or position, in particular a reference vector $u_{ref}$, of the hearing device; detect at least one movement and/or acceleration of the hearing device; determine at least one deviating orientation and/or position, in particular at least one deviation vector $v_d$, of the hearing device based on the detected at least one movement and/or acceleration; and/or determine at least one deviation, in particular at least one deviation angle $\theta$, between the reference orientation and/or position, in particular the reference vector $u_{ref}$, and the at least one deviating orientation and/or position, in particular the at least one deviation vector $v_d$.

Finally, according to a fourth aspect, a hearing system may comprise a first and a second hearing device. In particular, the hearing system may comprise a first and a second hearing aid. A "hearing system" may refer to a system comprising one or two hearing devices, and a "binaural hearing system" may refer to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone), or a tablet, or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

The first and second hearing devices may be configured to and/or comprise at least one means for performing a method according to the first aspect. The hearing system may be configured to determine a system deviation angle $\theta_{sys}$ based on an average of the deviation angles $\theta$ of the first and second hearing devices, and/or based on an average of the average tilt vectors $w_{avg}$ of the first and second hearing devices. A deviation angle $\theta$ may be estimated for each hearing device separately, or as a combination of the deviation angles $\theta$ from both hearing devices.

It has been found that with the subject-matter according to the different aspects, the wearing behavior of an individual user of a hearing device can be monitored. In particular, the subject-matter allow for monitoring tilt of the hearing device during daily use. Based on the determined at least one deviation, in particular the at least one deviation angle $\theta$, it is conceivable to determine an average tilt of the hearing device during daily use and hereby optimize for deviations between people. The average tilt may be taken into account for optimizing signal processing, positioning and/or configuration of the hearing device. This particularly allows for an optimized signal processing, e.g. a just-right sound amplification.

Exemplary embodiments of the first, second, third and fourth aspect may have one or more of the properties described below.

The hearing device may comprise at least two input devices. In particular, the hearing device may comprise at least two input transducer for receiving an acoustic signal, e.g. sound, from a user's surroundings and providing a corresponding electrical signal, e.g. an input audio signal. In particular, the hearing device may comprise at least two microphones.

The reference orientation and/or position, in particular the reference vector $u_{ref}$, may be determined as the movement and/or acceleration, in particular the movement and/or acceleration vector $v_{acc}$, measured when the at least two input devices of the hearing device are located in a substantially horizontal plane. In particular, the reference vector $u_{ref}$ may be determined as the vector between the at least two input devices of the hearing device when the input devices of the hearing device are located in a substantially horizontal plane. This allows for a particularly simple, repeatable, and standardized determination of the reference orientation and/or position.

For example, the reference vector $u_{ref}$ may be defined as the acceleration vector $v_{acc}$ measured when the hearing instrument microphones are located in the same horizontal plane, and the accelerometer solely is affected by gravity g. The determination of the reference orientation and/or position, in particular the reference vector $u_{ref}$, as the movement and/or acceleration, in particular the movement and/or acceleration vector $v_{acc}$, measured when the at least two input devices of the hearing device are located in a substantially (same) horizontal plane may, in particular, be performed by the hearing device itself or at least one means comprised by the hearing device.

Alternatively, the reference orientation and/or position, in particular the reference vector $u_{ref}$, may be determined from an average hearing device orientation and/or position across a plurality of users of hearing devices. The reference orientation and/or position may thus be based on empirical values.

The deviation angle $\theta$ may be determined as the angle between the reference vector $u_{ref}$ and the deviation vector $v_d$, i.e.

$$\theta = \operatorname{acos} \frac{u_{ref}^T v_d}{\|u_{ref}\| \|v_d\|}.$$

Alternatively, the deviation angle $\theta$ may be estimated from the reference vector $u_{ref}$ and the deviation vector $v_d$ without applying the acos-function, i.e.

$$\theta = \frac{u_{ref}^T v_d}{\|u_{ref}\| \|v_d\|}.$$

The deviation angle may e.g. be measured during daily use of the hearing device.

The estimated deviation angle $\theta$ may be divided into different planes.

In other words, we may separately estimate a left-right tilt of the head by a left-right deviation angle $\theta_{xz}$ (e.g. in an xy-plane), as well as an up-down tilt of the head by an up-down deviation angle $\theta_{yz}$ (e.g. in a yz-plane). In this case, the z-axis of the xyz-coordinate system would be aligned with the direction of gravity (and/or aligned with the reference vector $u_{ref}$), when the head of the user is in an upright position.

Thereby, the left-right deviation angle $\theta_{xz}$ may be calculated as:

$$\theta_{xz} = \operatorname{acos} \frac{v_{d;xz}^T u_{ref}}{\sqrt{v_{d;xz}^T v_{d;xz} u_{ref}^T u_{ref}}} \cdot \operatorname{sign}(LR),$$

where sign(LR) is a function whose sign depends on whether the tilt of the head is towards the left or towards the right side.

Similarly, the up-down deviation angle $\theta_{yz}$ may be calculated as:

$$\theta_{yz} = \operatorname{acos} \frac{v_{d;yz}^T u_{ref}}{\sqrt{v_{d;yz}^T v_{d;yz} u_{ref}^T u_{ref}}} \cdot \operatorname{sign}(UD)$$

where sign(UD) is a function whose sign depends on whether the tilt of the head is upwards or downwards.

In order to resolve whether the tilt of the head is towards the left or right side, we consider the sign of the scalar product between the measured deviation vector $v_d$ projected onto the x-y plane and the side normalization vector, i.e.:

$$\operatorname{sign}(LR) = \operatorname{sign}(v_{d;xy}^T y),$$

with y defined as above.

Similarly, we can distinguish between an up-down tilt as:

$$\operatorname{sign}(UD) = \operatorname{sign}(v_{d;xy}^T x),$$

with x defined as above.

Accordingly, the estimated deviation angle $\theta$ may in the present application either refer to a deviation angle $\theta$ that combines left-right and up-down tilts of the user's head, or may refer to separated left-right deviation angle $\theta_{xz}$ and up-down deviation angle $\theta_{yz}$.

A plurality of movements and/or accelerations of the hearing device may be detected. A "plurality" may refer to two or at least two movements and/or accelerations of the hearing device. In particular, a "plurality" may refer to more than two, preferably more than ten, more preferably more than 100, even more preferably more than 100, movements and/or accelerations of the hearing device.

Preferably, the plurality of movements and/or accelerations of the hearing device may be detected during daily use. For example, it is conceivable that at least one movement and/or acceleration of the hearing device may be detected continuously (such as with one or more seconds interval of the user wearing the hearing device). It is also conceivable, that every movement and/or acceleration of the hearing device may be detected.

An average tilt of the hearing device may be determined based on the detected plurality of movements and/or accelerations. Determining an average tilt of the hearing device allows for conclusions on, in particular monitoring, the wearing behavior of the hearing device user. In particular, an average tilt vector $w_{avg}$ of the hearing device may be determined based on the plurality of movements and/or accelerations.

In particular, it is conceivable to optimize signal processing, positioning and/or configuration of the hearing device based on the average tilt of the hearing device. This particularly allows for an optimized signal processing, e.g. a just-right sound amplification. The average tilt may be used to update different hearing device parameters. The average tilt of the hearing device may be used to control parameters of an adaptive spatial noise reduction system. For example, if the average tilt suggests that position of the hearing device deviates from the optimal direction, the weights controlling the directional system may be modified in order to take into account that the hearing device on the particular user typically points towards a different direction. Also, other beamformer weights, such as e.g. the weights of an own voice beamformer, may be modified, according to the average tilt of the hearing device. Also, filter coefficients compensating for the microphone location effect (MLE) may be modified depending on the average tilt.

The average tilt, in particular the average tilt vector $w_{avg}$, of a hearing device may be determined at least partly based on a plurality of deviating orientations and/or positions determined based on the detected plurality of movements and/or accelerations. In particular, the average tilt, in particular the average tilt vector $w_{avg}$, may be determined at least partly based on a plurality of deviation vectors $v_d$. Additionally, the average tilt, in particular the average tilt vector $w_{avg}$, may be determined at least partly based on the reference orientation and/or position, in particular reference vector $u_{ref}$.

The average tilt, in particular the average tilt vector $w_{avg}$, of a hearing device may be determined at least partly based on a plurality of deviations, in particular a plurality of deviation angles θ, between the reference orientation and/or position, in particular the reference vector $u_{ref}$, and a plurality of deviating orientations and/or positions, in particular a plurality of deviation vectors $v_d$, determined based on the plurality of movements and/or accelerations of the hearing device.

Only deviations, in particular deviation angles θ, and/or deviating orientations and/or positions, in particular deviation vectors $v_d$, below a threshold value may be taken into account for determining the average tilt, in particular the average tilt vector $w_{avg}$. For example, when the user of the hearing device is looking up, looking down, and/or tilting his head, the deviating orientation and/or position, in particular the direction of the deviation vector $v_d$, may deviate significantly from the reference orientation and/or position, in particular the direction of the reference vector $u_{ref}$. These deviations, in particular these deviation angles θ, however, may not allow for conclusions on typical deviations from the reference orientation and/or position during the intended use.

When the detected movement and/or acceleration of the hearing device indicates a walking of the hearing device user for an amount of time larger than a threshold, deviations, in particular deviation angles θ, and/or deviating orientations and/or positions, in particular deviation vectors $v_d$, may be not taken into account for determining the average tilt, in particular the average tilt vector $w_{avg}$.

Also, other input may determine the update of the average tilt vector $w_{avg}$. The average tilt vector $w_{avg}$ may e.g. be updated based on situations, where the noise reduction system typically is most active (i.e. loud environments and/or poor SNR).

Different average tilt vector $w_{avg}$ estimates may be stored simultaneously. Hereby, we may have a separate average tilt vector $w_{avg}$ based on whether the deviation vectors $v_d$ does not deviate too much from the reference vector $u_{ref}$. Further, we may have another tilt estimate which is estimated based on whether the noise reduction is active (e.g. depending on the sound level). Hereby, we know how the hearing device user tilts his head while listening to speech in noisy conditions. Such an additional average tilt vector $w_{avg}$ may solely depend on sound level or SNR, or it may be estimated in situations depending both on sound level, SNR, and deviation vectors $v_d$.

In particular, only deviations, in particular deviation angles θ, below at least 15 degrees, preferably at least 20 degrees, more preferably 20 degrees may be taken into account for determining the average tilt, in particular the average tilt vector $w_{avg}$.

The threshold value may depend on the direction in which the hearing device is moved and/or accelerated. For example, the threshold value may be different for substantially vertical movements, e.g. when the user tilts his head by looking up or down (e.g. relating to the up-down deviation angle $θ_{yz}$), than for substantially horizontal movements, e.g. when the user tilts his head to the side (e.g. relating to the left-right deviation angle $θ_{xz}$).

Deviations above a threshold value may be considered as outliers, which may not be used for determination of the average tilt from the reference orientation and/or position. Alternatively, or additionally, other parameters may be considered when determining the average tilt. For example, it may be detected, e.g. by the hearing device itself and/or means comprised by the hearing device, that the hearing device is not mounted at the ear of the user, e.g. when instead the hearing device is placed in a charging unit. In this case, movements and/or accelerations of the hearing device may either not be detected at all or not considered when determining the average tilt of the hearing device.

The plurality of movements and/or accelerations of the hearing device may be detected continuously. For example, every movement and/or acceleration of the hearing device may be detected. The plurality of movements and/or accelerations of the hearing device may be logged, in particular continuously logged.

It is also conceivable that movements and/or accelerations of the hearing device are detected in time intervals. For example, a movement and/or acceleration of the hearing device may be detected only every second. For example, the time intervals may vary.

The average tilt vector $w_{avg}(n)$ of a current sample n may be determined recursively.

The average tilt vector $w_{avg}(n)$ of a current sample n may be (recursively) determined as $$w_{avg}(n) = \begin{cases} w_{avg}(n-1), & \text{if the threshold value is exceeded;} \\ (1-\lambda)w_{avg}(n-1) + \lambda v_d(n), & \text{otherwise} \end{cases},$$

where $0 \leq \lambda \leq 1$ is a coefficient controlling the amount of smoothing and $v_d(n)$ is the currently determined deviation vector.

Alternatively, or additionally, λ may depend on the deviation angle θ.

Further, it is foreseen that $w_{avg}(n)$ may alternatively be formulated as:

$$w_{avg}(n) = \begin{cases} w_{avg}(n-1), & \text{if the threshold value is exceeded;} \\ \lambda w_{avg}(n-1) + (1-\lambda)v_d(n), & \text{otherwise} \end{cases},$$

The average tilt vector $w_{avg}(n)$ may thus be determined in a simple way based on the current determination deviation vector $v_d(n)$ for the sample n and the previous average tilt vector $w_{avg}(n-1)$. Contrary to continuously logging the accelerometer data, this allows for only the most recent average tilt vector being necessary to log. In particular, this allows for simple determination of the average tilt of the hearing device along with a low demand for storage space, as only the previous average tilt vector $w_{avg}(n-1)$ needs to be stored. From $w_{avg}(n)$, the average tilt of the hearing device may be determined, and e.g. the parameters of a directional system, such as the target direction, may be updated based on the average tilt.

In case the deviation angle θ is divided into different planes, the applied threshold value may vary depending on the respective plane.

In other words, when the deviation angle θ is divided into a left-right deviation angle $θ_{xz}$ (i.e. a left-right tilt of the head) and an up-down deviation angle $θ_{yz}$ (i.e. an up-down tilt of the head), the mentioned threshold value may vary depending on whether the tilt is left-right or up-down.

The hearing device may comprise a memory unit.

The method may further comprise logging and storing the estimated average tilt vector $w_{avg}(n)$ in the memory of the hearing device or in a memory of an auxiliary device connected to the hearing device.

For example, the method may comprise storing the estimated average tilt vector $w_{avg}(n)$, e.g. every second, every 10 seconds, every minute, every $10^{th}$ minute, or every hour, etc. For example, the method may comprise storing the estimated average tilt vector $w_{avg}(n)$ after every time the hearing device has been used, e.g. every time the hearing device is put into the battery charger.

The method may further comprise monitoring the amount of time where the average tilt, in particular the average tilt vector $w_{avg}(n)$ (and/or the deviation angle θ, and/or the deviation vector $v_d(n)$) is within the threshold.

The method may further comprise monitoring the amount of time where the average tilt, in particular the average tilt vector $w_{avg}(n)$ (and/or the deviation angle θ, and/or the deviation vector $v_d(n)$), exceeds the threshold.

The at least one hearing device may comprise one or more different counters for determining said amount of time.

The above-mentioned update of the average tilt vector $w_{avg}(n)$ is binary. In other words, either we update or we do not update.

Not updating is similar to setting λ=0.

A more continuous decision may as well be determined, where the value of λ depends on the amount of deviation, in particular the amount of at least one deviation angle θ, such that little deviation leads to a larger value of λ compared to higher amounts of deviations. The exact range of λ (between 0 and 1) may depend on how frequent the average tilt vector $w_{avg}(n)$ is updated. Typically, the value of λ may be smaller than 0.1 or smaller than 0.01.

The method may further comprise estimating and/or logging and/or storing the estimated average tilt vector $w_{avg}(n)$ during conversation, i.e. logging the estimated average tilt vector $w_{avg}(n)$ based on detection of the user's own voice. The estimated tilt vector $w_{avg}(n)$ may be averaged separately depending on whether the user is talking or the user is listening to the other part of the conversation.

In addition, the estimated average tilt vector $w_{avg}(n)$ may be logged depending on whether the user is watching television.

For example, this may e.g. be based on whether the hearing device is in a tv-program setting or the user is receiving audio transmitted directly from the TV (or an intermediate device (TV box)) to the hearing device. Depending on the estimated average tilt vector $w_{avg}(n)$ while the user is watching TV, the noise reduction parameters may be adjusted accordingly.

The method may further comprise controlling and/or regulating signal processing, in particular controlling and/or regulating noise reduction, of the hearing device based on the at least one deviation, in particular at least one deviation angle θ. In particular, based on the at least one deviation, in particular at least one deviation angle θ, of the hearing device, directional noise reduction may be controlled and/or regulated. For example, directionality may be controlled and/or regulated depending on the at least one deviation, in particular at least one deviation angle θ, of the hearing device.

The method may further comprise controlling and/or regulating signal processing, in particular controlling and/or regulating a microphone location effect (MLE), of the hearing device based on the at least one deviation, in particular at least one deviation angle θ.

It may be conceivable, that signal processing, in particular noise reduction and/or MLE, of the hearing device may only be controlled and/or regulated if the deviation, in particular at least one deviation angle θ, is above a threshold value.

Signal processing, in particular noise reduction, of the hearing device may be disabled, in particular gradually disabled, if the deviation, in particular the at least one deviation angle θ, exceeds a threshold value. Noise reduction might only be needed, when the hearing device is oriented and/or positioned in the reference orientation and/or position. In particular, noise reduction may be only needed when the hearing device is pointing in the horizontal direction as most sounds of interest typically are present in the horizontal plane. If the user is looking upwards or downwards, speech intelligibility in noise may typically not be the main issue. In such situations directional noise reduction may not be desirable, and rather omni directional listening is preferred. Directional noise reduction may be disabled, if the hearing device does not point in the horizontal direction.

It may be conceivable, that noise reduction, of the hearing device is disabled if the deviation, in particular at least one deviation angle θ, is above a threshold value. For example, signal processing, in particular noise reduction, of the hearing device may be controlled and/or regulated if the deviation, in particular at least one deviation angle θ, is above a first threshold value and disabled if the deviation, in particular at least one deviation angle θ, is above a second threshold value.

The hearing device may comprise at least one sensor for detecting at least one movement and/or acceleration of the hearing device. The sensor may provide information about the orientation and/or position of the hearing device and detect if the hearing device user is moving or turning his head.

The sensor may be any suitable type of sensor capable of detecting movement and/or acceleration and/or orientation and/or position of the hearing device. The sensor may be an integrated part of the hearing device or be attached to the hearing device in any suitable way.

It may be beneficial that the sensor is or comprises an accelerometer and/or a gyroscope. The sensor may be or comprise a compass, e.g. a magnetic compass, e.g. a magnetometer. The sensor may be or comprise a positioning system, e.g. a receiver of a satellite positioning system, e.g. a GPS receiver. Hereby, it is possible to use robust and reliable standard components to detect the desired data.

For example, the sensor may be an accelerometer. An accelerometer is a sensor that detects its own acceleration. This is usually done by determining the inertial force acting on a test mass. In this way, it can be determined, for example, whether an increase or decrease in speed is taking place.

The accelerometer may be an accelerometer configured to measure linear acceleration in one, two or three directions, whereas the gyroscope may be a gyroscope configured to measure angular velocity in one, two or three directions. A compass preferably indicates a direction in a horizontal plane at a particular place on the surface of the earth, e.g. in a North, West, South, East framework.

It may be an advantage that the hearing device (e.g. hearing aid) contains both an accelerometer and a gyroscope so that both linear and rotational movement of the head of the user or of the hearing device can be determined with high precision and accuracy. In an embodiment, the hearing device (or a device in communication with the hearing device) additionally comprises a positioning system and/or a compass.

Both accelerometers and gyroscopes are as components designed with specific x, y and z axes relative to their housing. Designing the sensors into hearing devices can be done in ways where the axes of orientations of the sensors directly matches the axes of orientations of the hearing devices (e.g., an axis defined by a 'direction of microphones') when they are placed on a person's ears. In this way, no conversion of the accelerometer data is needed to achieve correct movement data (i.e., moving forward may e.g. correspond directly to the positive direction of the accelerometers x-axis). Alternatively, a fixed transformation of the data can be carried out by use of fixed spatial rotation of the axes, based on previously calculated placement of the sensors in the user situation relative to a characteristic direction of the hearing device (e.g. a direction defined by the housing of the hearing device, e.g. an outer edge of the housing). But to allow user individualization as well as allowing for free orientation of the sensors, it is advantageous to detect the sensors' placement relative to the head of the user by detecting movement data for each hearing device and to compare such data between the hearing devices. A spatial rotation matrix may be determined from the combined data, and this can be used for spatial transformation of the sensors' axes to the user's current head orientation. The transformation should preferably be continuously adapting to the user's head movements.

For example, most target acoustic sources of interest in noisy backgrounds may be present in or close to the horizontal plane. Therefore, it may be better to avoid updating the target direction if the person's hearing device is pointing away from the horizontal plane. Accordingly, the hearing device may be configured to update the target direction in case the at least one deviation vector $v_d$ is located in the (substantially) horizontal plane.

The disclosure of a method step is to be understood to also disclose the respective means for performing the method step. Likewise, the disclosure of means for performing a method step is to be understood to also disclose the respective method step.

Further configurations and advantages of the invention will be explained in the following detailed description of some exemplary embodiments of the present invention in conjunction with the drawing.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features, and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1A:
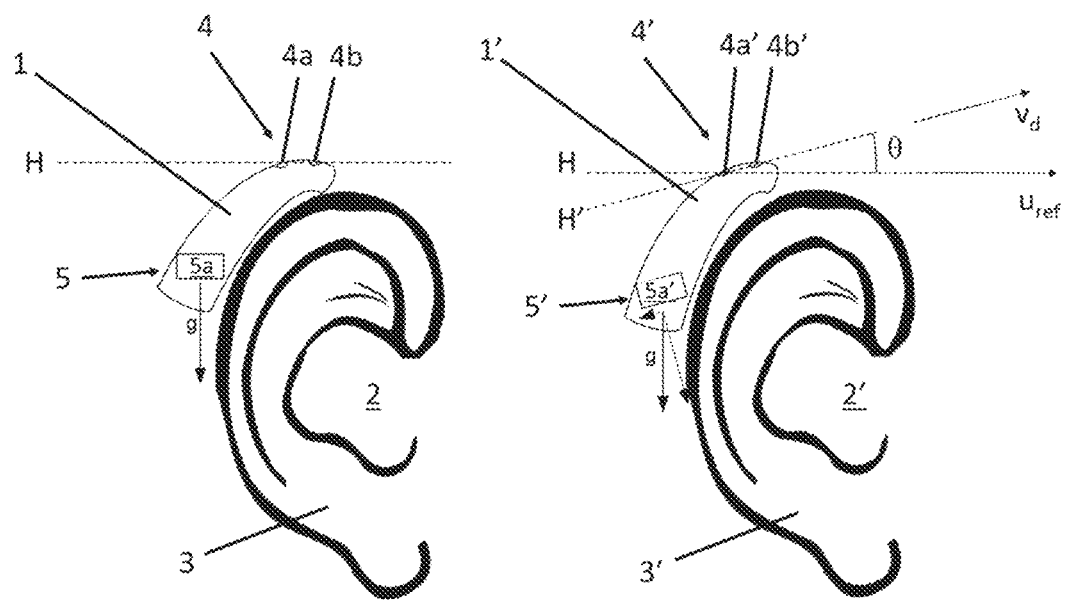
FIGS. 1, *b* are a schematical representation of a hearing device mounted in a first and a second position at or behind an ear of a user and corresponding beampatterns.

FIG. 1*a* illustrates a schematical view of a hearing device 1, in particular a BTE hearing aid, mounted in a first position at or behind an ear 3 of a first user 2. The hearing device 1 comprises two microphones 4*a*, 4*b* as input devices 4 as well as a built-in accelerometer 5*a* as a sensor 5 for detecting a movement and/or acceleration of the hearing device 1. The hearing device 1 is positioned such that the microphones 4*a*, 4*b* are located in the same horizontal plane H.

The noise reduction system (not shown), e.g. including a directional system, of the hearing device 1 relies on the assumption that the microphones 4*a*, 4*b* are actually located in the horizontal plane H as shown in FIG. 1*a*. Typically, the noise reduction system assumes that the user 2 is listening to sound impinging from the front, i.e. the look direction of the user 2. The hearing device 1 thus uses directionality to emphasize sounds from the front and attenuate sounds from the sides and the back as represented by the corresponding beam pattern below. Accordingly, optimal conditions for processing of the noise reduction system can be achieved when the microphones 4a, 4b are located in the horizontal plane H. This is, however, not always achieved.

In particular among different users, it cannot be guaranteed that the hearing device is positioned equally, in particular that the input devices of the hearing device are positioned along a horizontal line.

Figure 1B:
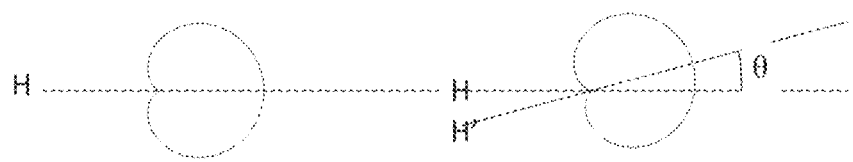

FIG. 1b illustrates a schematical view of a hearing device 1' mounted in a second position at or behind an ear 3' of a second user 2'. The hearing device 1' also comprises two microphones 4a', 4b' as input devices 4'. Contrary to the hearing device 1 of FIG. 1a, however, the hearing device 1' of FIG. 1b is positioned such that the microphones 4a', 4b' are located in a plane H' that deviates from the horizontal plane H by a deviation angle θ. Nevertheless, the signal processing, in particular the noise reduction system, e.g. including a directional system, of the hearing device 1' of FIG. 1b still relies on the same assumptions as for hearing device 1 of FIG. 1a in the first position, namely that the user 2' is wearing the hearing device 1' such that the microphones 4a', 4b' are located in the horizontal plane H as shown by the beam pattern in the lower parts of the FIGS.

Figure 2:
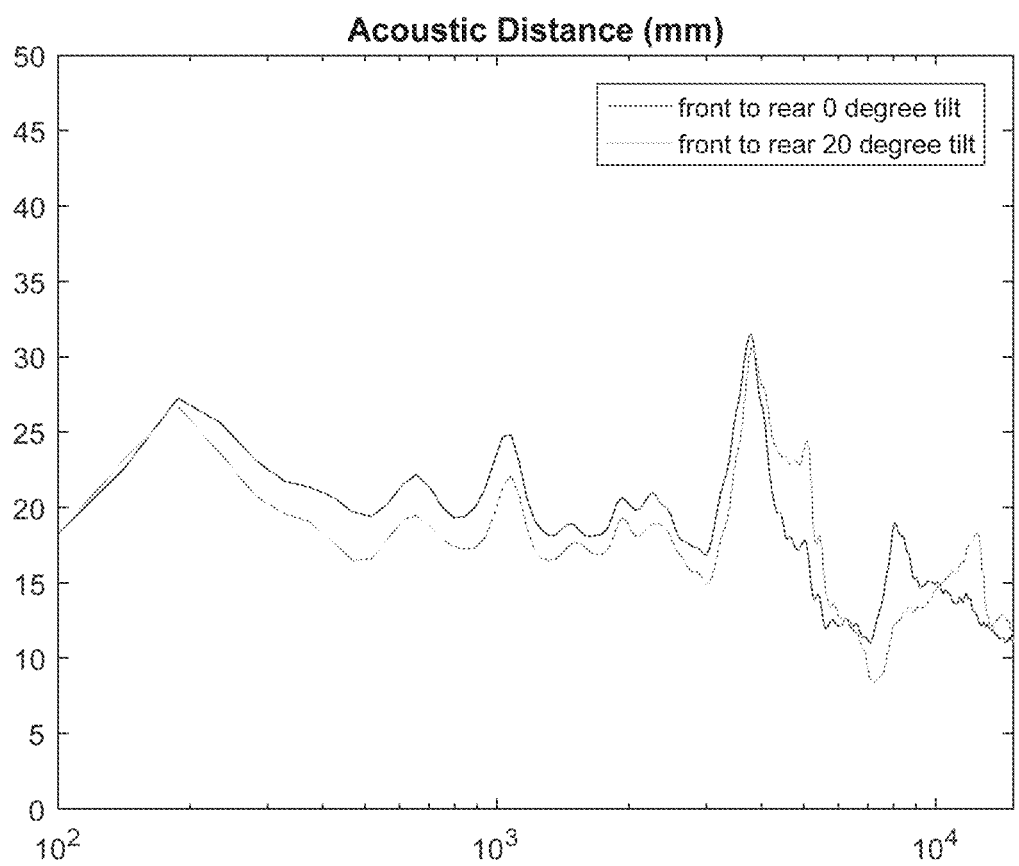
FIG. 2 is a diagram of how the acoustic distance from a signal impinging from the front changes depending on how the hearing device input devices are located at the ear.

As this, however, is not the case, the directional system has sub-optimal conditions for its processing and directional noise reduction works in a sub-optimal way. As shown, e.g. in FIG. 2, the acoustic distance, e.g. from a signal impinging from the front, changes depending on how the input devices 4, in particular the microphones 4a, 4b, of at least one hearing device are located at the user's ear. A horizontally mounted microphone array has a greater acoustic distance compared to a microphone array which e.g. is pointing upwards by 20 degrees.

This, however, not only holds for different users. This may also apply to the case where e.g. a user's wearing behavior deviates from a standardized wearing behavior across multiple users and/or an initial fit of the hearing device to the user e.g. by an HCP in a clinic. For example, even though the hearing device 1 may have been fitted to the ear 3 of the user 1 as shown in FIG. 1a e.g. by an HCP, the user 2 might rather hold his head in a more upright position throughout daily use, which causes the microphones 4a, 4b to be located in a plane H' that deviates from the horizontal plane H by a deviation angle θ in particular an average tilt angle $\theta_{avg}$. Thus, for the same user wearing the hearing device 1 throughout the day, it cannot be guaranteed that the hearing device 1 is e.g. worn as initially adjusted or according to a mean wearing position across multiple users. In particular, it cannot be guaranteed that the input devices 4 of the hearing device 1 are always positioned along the horizontal line H.

Figures 3A, 3B:
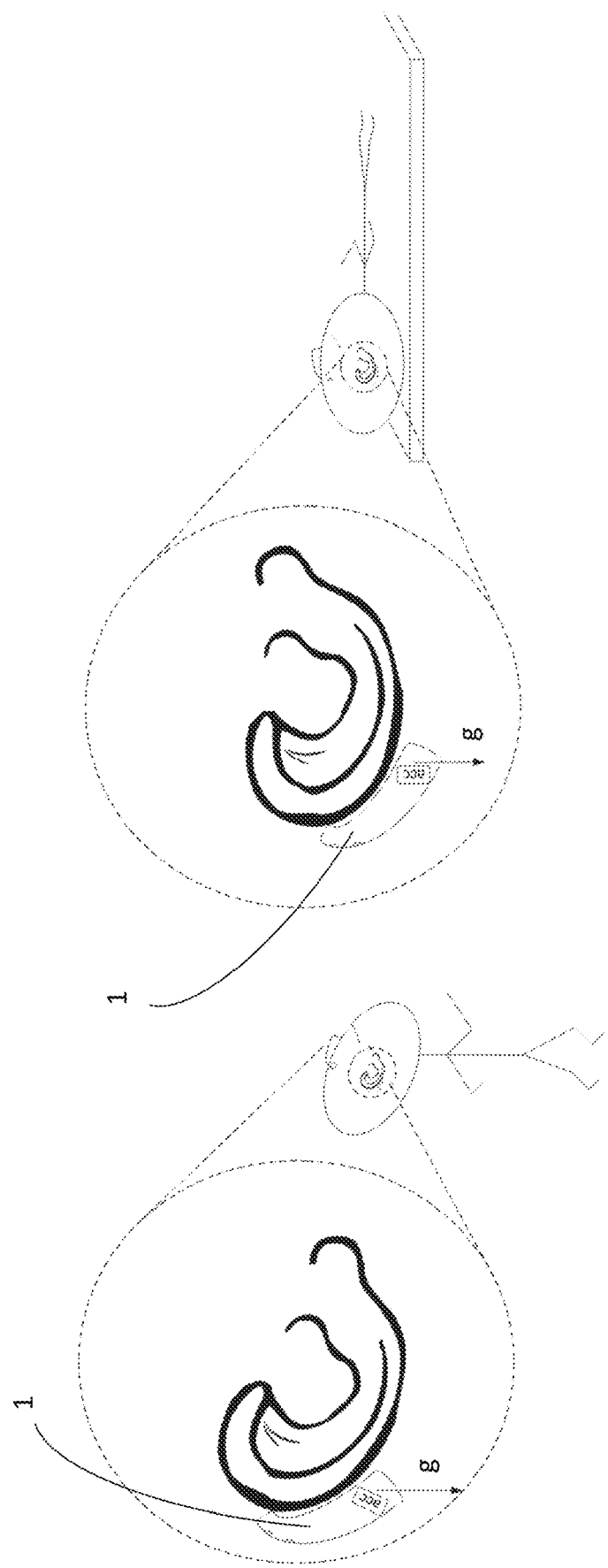
FIGS. 3*a, b* are a schematical representation of a hearing device mounted at or behind an ear of a user when the head of the user is in a first and a second position.

On top of that, a user of a hearing device is exposed to various situations and environments during a day, which may cause the at least one hearing device not be pointing towards the horizontal plane H. Such situations could e.g. be while the user is looking up or lying down. Also in these cases, the direction of the hearing device microphone array may deviate from the intended direction while listening and thus, directional noise reduction may work in a sub-optimal way. Such situations are exemplified in FIG. 3a, where the user 2 is looking up, and FIG. 3b, where the user 2 is lying down.

To monitor and preferably react to wearing behavior of an individual user, the hearing device 1 is configured to and/or comprises means for performing a method comprising the steps determining a reference orientation and/or position, in particular a reference vector $u_{ref}$, of a hearing device; detecting at least one movement and/or acceleration of the hearing device; determining at least one deviating orientation and/or position, in particular at least one deviation vector $v_d$, of the hearing device based on the detected at least one movement and/or acceleration; and determining at least one deviation, in particular at least one deviation angle θ, between the reference orientation and/or position, in particular the reference vector $u_{ref}$, and the at least one deviating orientation and/or position, in particular the at least one deviation vector $v_d$.

In FIGS. 1a and 1b, the reference vector $u_{ref}$ corresponds to horizontal plane H. As can be seen from FIG. 1a, when the hearing device 1 is positioned according to its reference orientation and position, the accelerometer 5a only measures gravity g as acceleration. In FIG. 1b, the movement and/or acceleration of the hearing device 1 is detected by the accelerometer 5a. Based on this detected movement and/or acceleration, the deviation vector $v_d$ is determined, which is in line with deviating plane H'.

Between the reference orientation and/or position and the deviating orientation and/or position, the deviation angle θ is determined. In particular, the deviation angle θ is determined as the angle between the reference vector $u_{ref}$ and the deviation vector $v_d$, i.e.

$$\theta = \text{acos}\frac{u_{ref}^T v_d}{\|u_{ref}\|\|v_d\|}.$$

Figure 4:
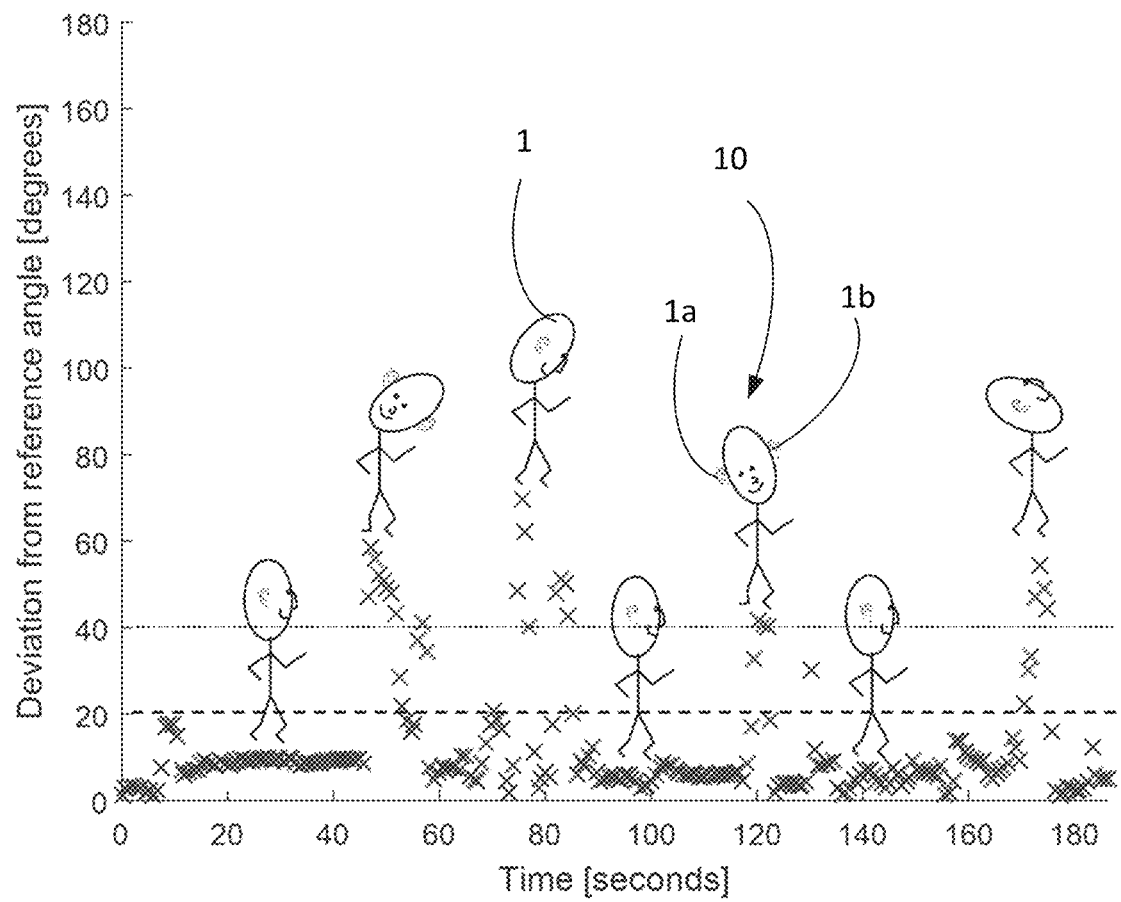
FIG. 4 is a diagram of a plurality of deviation angles θ determined based on a plurality of movements and/or accelerations of a hearing device according to the third aspect in a time interval of approximately 180 seconds.

As shown in FIG. 4, during daily use of a hearing device 1, a plurality of movements and/or accelerations of the hearing device 1 may be detected. Based on these plurality of movements and/or accelerations of the hearing device 1, an average tilt of the hearing device 1 may be determined. In particular, a plurality of deviation vectors $v_d$ may be determined based on these plurality of movements and/or accelerations. An average tilt vector $w_{avg}$ may be determined at least partly based on the plurality of deviation vectors $v_d$.

For determining the average tilt vector $w_{avg}(n)$, only deviation vectors $v_d$ below a threshold value may be taken into account. In particular, the average tilt vector $w_{avg}(n)$ of a current sample n may be determined as $$w_{avg}(n) = \begin{cases} w_{avg}(n-1), & \text{if the threshold value is exceeded;} \\ (1-\lambda)w_{avg}(n-1) + \lambda v_d(n), & \text{otherwise} \end{cases},$$

where $0 \le \lambda \le 1$ is a coefficient controlling the amount of smoothing and $v_d(n)$ is the currently determined deviation vector. From $w_{avg}(n)$, the average tilt of the hearing device may be determined, and e.g. the parameters of a directional system, such as the target direction, may be updated based on the average tilt. Also, an average tilt angle $\theta_{avg}$ may be determined based on the deviation angle θ between the reference vector $u_{ref}$ and the average tilt vector $w_{avg}(n)$.

Alternatively, based on a plurality of movements and/or accelerations of the hearing device 1 that are detected during daily use, a plurality of deviation vectors $v_d$ may be determined and between the reference vector $u_{ref}$ and the plurality of deviation vectors $v_d$, a plurality of deviation angles θ are determined. An average tilt vector $w_{avg}$ may be determined at least partly based on the plurality of deviation angles θ. For determining the average tilt, only deviation angles θ below a threshold value may be taken into account.

FIG. 4 illustrates an example of logged deviation angles θ during three minutes of daily use of a hearing device 1 worn by a user 2. The reference vector $u_{ref}$ is determined as the movement and/or acceleration, in particular the movement and/or acceleration vector $v_{acc}$, measured when the two input devices 4a, 4b of the hearing device 1 are located in a substantially horizontal plane H. During three minutes of use of the hearing device 1, the deviation angles θ are each determined as the angle between the reference orientation and position of the hearing device 1, namely reference vector $u_{ref}$, and the deviating orientation and position, namely the current deviation vector $v_d$, i.e.

$$\theta = \operatorname{acos}\frac{u_{ref}^T v_d}{\|u_{ref}\|\|v_d\|}.$$

In the diagram in FIG. 4, the time in seconds is provided on the x axis (abscissa) and the deviation from a reference angle $u_{ref}$ in degrees on the y axis (ordinate). As can be recognized, there are deviations from the reference vector $u_{ref}$ during most of the time. Most of the deviation angles θ are between 0 and 20 degrees (below the dashed line). However, when the user is looking up, looking down, or tilting his head, e.g. when the user is looking down at his phone or reading a book, the direction of the currently measured deviation vector $v_d$ deviates significantly from the direction of the reference vector $u_{ref}$. Deviation angles θ above 20 degrees, even above 40 degrees, are determined. For example, between about 45 and 50 seconds, the user is tilting his head to the left side. During this time, the deviation angle θ has a value of up to 60 degrees.

The hearing device, or an auxiliary device connected to the hearing device, may comprise a memory. Thereby, the hearing device (or the auxiliary device) may store/log the behavioral pattern of the user as derived from the deviation angles θ.

It has been found that particularly deviation angles θ above 20 degrees refer to rather intended movements of the user such as head tilts. These deviation angles θ do not allow conclusions about the typical deviations from the reference vector $u_{ref}$ during the intended use of the hearing device 1. Therefore, for determining the average tilt of the hearing device 1, which may allow for conclusions about how the individually mounted/positioned hearing device 1 deviates from an optimally mounted hearing device, the threshold value for deviation angles θ is set to 20 degrees, i.e. only deviations, in particular deviation angles θ, below the threshold value of 20 degrees are taken into account. The threshold value may depend on the direction in which the hearing device 1 is moved and/or accelerated.

Based on these deviations below 20 degrees, conclusions may be drawn that the user 2 is wearing the hearing device 1 as intended. On the other hand, deviation angles θ greater than 20 degrees are rather considered as outliers, which are not used for determining the average tilt.

In the case of a hearing system 10 with hearing devices 1a, 1b located at both ears of a user 2, the deviation angle θ may be estimated for each hearing device separately or as a combination of the deviation angles θ from both hearing devices 1a, 1b. In particular, the hearing system 10 may be configured to determine a system deviation angle $\theta_{sys}$ based on an average of the deviation angles θ of the first and second hearing devices 1a, 1b. For defining a threshold value, in particular for defining deviation angles as outliers, in case of a hearing system 10 comprising a first and a second hearing device 1a, 1b that are each configured to and/or comprise means for performing a respective method, it may be advantageous to consider deviation angles θ of both hearing devices at the same time.

Instead, these deviation angles θ above the threshold value of, for example, 20 degrees rather serve as a basis for controlling and/or regulating signal processing of the hearing device 1. In particular, based on a deviation angle θ above the threshold, signal processing of the hearing device 1 may be controlled and/or regulated. While signal processing might only be adjusted when the deviation angle θ exceeds the first threshold of 20 degrees (dashed lined), for example when the user slightly looks up or down, signal processing, in particular noise reduction, of the hearing device might be completely disabled if the user tilts his head to the side and the deviation angle θ exceeds a second threshold value of e.g. 40 degrees (dotted lined).

The decision of when to update the average tilt vector $w_{avg}(n)$ may depend on both the ipsilateral and the contralateral tilt angles, in particular the at least one deviation vector $v_d$, of the ipsilateral and the contralateral hearing device.

Figure 5C:
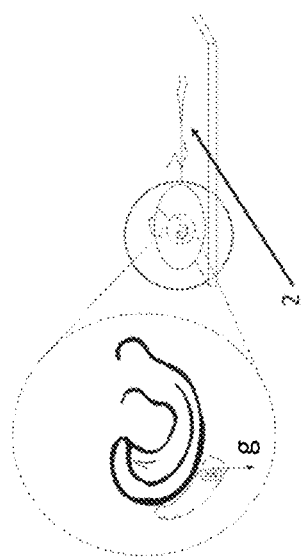
FIGS. 5*a, b, c* are a schematical representation of a hearing device according to the third aspect mounted at or behind an ear of a user when the head of the user is in a first, a second and a third position.
Figure 5B:
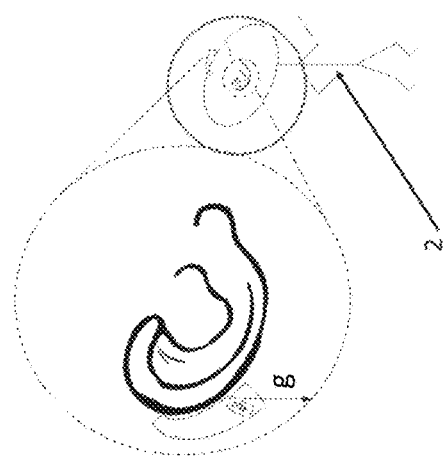
Figure 5A:
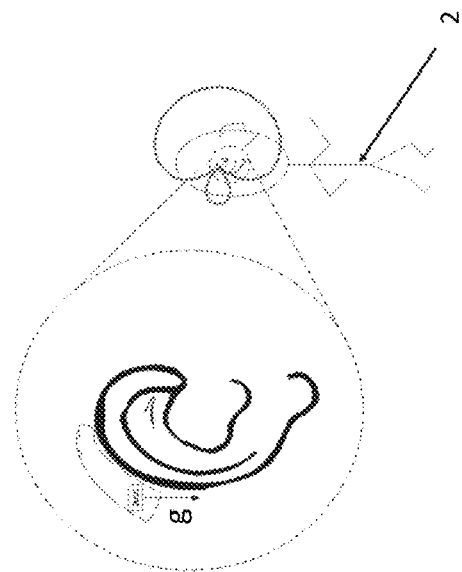

In FIG. 5a, a user 2 is wearing a hearing device 1 which is positioned at least substantially according to a reference orientation and/or position, here the direction of gravity g. In particular, the deviation from the reference orientation and/or position is below a threshold value of e.g. 20 degrees. In this situation, directional noise reduction, which is illustrated by the directional beam pattern, is enabled.

However, directionality may be disabled if one hearing device 1 or both, a first hearing device 1a and a second hearing device 1b, of a hearing system 10 (as shown in FIG. 4) are not positioned in an upright position. The hearing system 10 may be configured to determine a system deviation angle $\theta_{sys}$ based on an average of the average tilt vectors $w_{avg}(n)$ or of the deviation angles θ of the first and second hearing devices 1a, b.

For example, directionality is disabled if the head is tilted, e.g. either to the left, right, front or back or upwards. The directional system may be disabled gradually as function of angle and the threshold angle may be different depending on whether the instrument is tilted to the left, right up or down.

In FIG. 5b, the user 2 is looking upwards. The hearing device 1 is tilted such that the direction of the deviation vector $v_d$ (the direction of gravity g) differs more from the reference vector $u_{ref}$ than a threshold angle. In this case, speech intelligibility is assumed not to be the main concern and directional noise reduction is thus disabled, which is illustrated by the omni directional beam pattern.

Also, in FIG. 5c, as the user 2 of the hearing device 1 is laying down e.g. in a bed, speech intelligibility is assumed not to be the main concern and directional noise reduction is thus disabled, which is illustrated by the omni directional beam pattern.

Figure 6A:
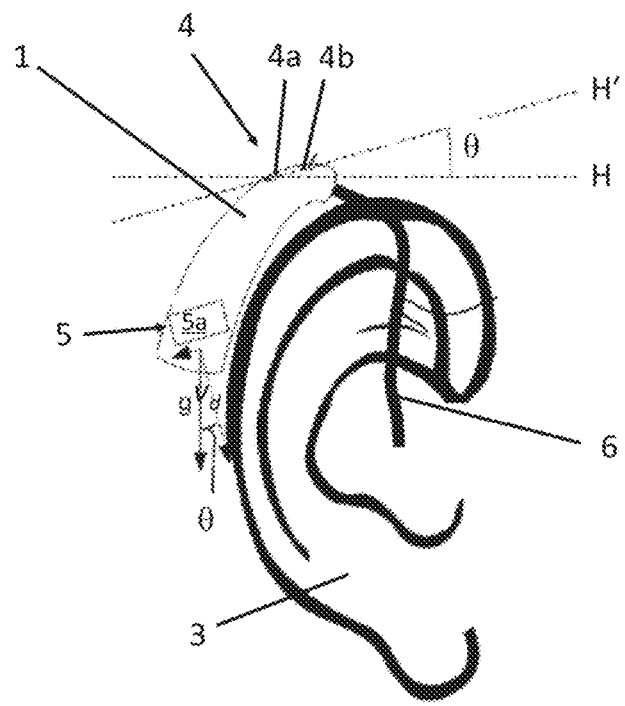
FIGS. 6*a, b* are a schematical representation of a hearing device according to a third aspect configured according to a method of the first aspect.
Figure 6B:
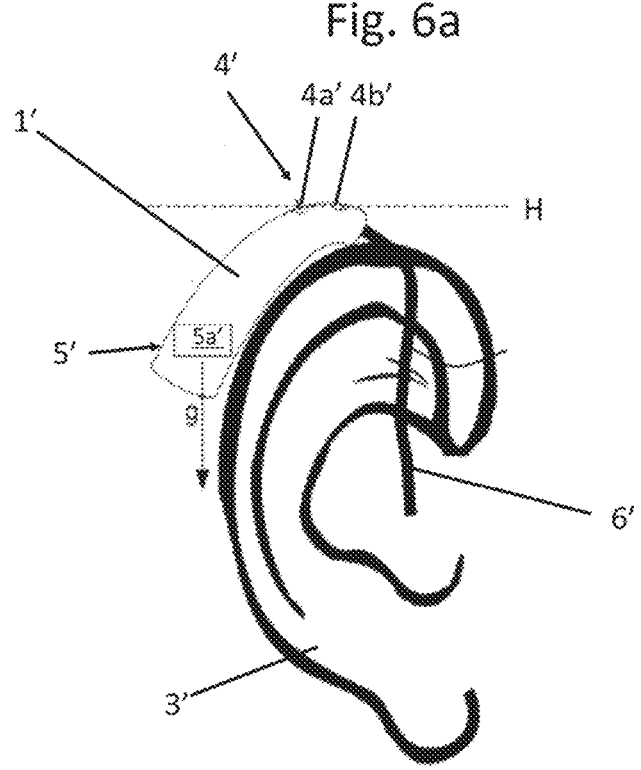

As shown in FIG. 6a, b, besides optimizing signal processing, the method, in particular the determined average tilt, may be used for optimizing positioning and/or configuration of the hearing device 1. In FIG. 6a, hearing device 1 which is a BTE hearing aid with a connecting part 6, in particular a receiver tube or wire, is shown. The connecting part 6 has a first length which is greater than the second length of the connecting part 6' of the BTE hearing aid 1' in FIG. 6b. In the case of FIG. 6a, where the hearing device 1 is a BTE hearing aid, it is advisable that the connection tube 6 of the BTE is provided with a shorter length, so that the BTE is rather located on the top of the user's ear 3 and the microphones 4a, 4b as input devices 4 are in the horizontal plane H as shown in FIG. 6b. The shorter length of the connecting part 6' of the hearing device 1 compensates for the hearing device being worn in a sub-optimal position as shown in FIG. 6*a*.

A computer program (product) comprising instructions which, when the program is executed by a computer, cause the computer to carry out (steps of) the method described above, in the 'detailed description of embodiments' and in the claims is furthermore provided by the present application.

In an aspect, the functions may be stored on or encoded as one or more instructions or code on a tangible computer-readable medium. The computer readable medium includes computer storage media adapted to store a computer program comprising program codes, which when run on a processing system causes a data processing system to perform at least some (such as a majority or all) of the steps of the method described above, and in the claims.

By way of example, and not limitation, such computer-readable media can comprise RAM, ROM, EEPROM, CD-ROM, or other optical disk storage, magnetic disk storage, or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

In an aspect, a data processing system comprising a processor adapted to execute the computer program for causing the processor to perform at least some (such as a majority or all) of the steps of the method described above and in the claims are provided.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method performed by at least one hearing device, the method comprising:
   determining a reference orientation or position, reference vector $u_{ref}$, of a hearing device;
   detecting at least one movement or acceleration of the hearing device;
   determining at least one deviating orientation or position, at least one deviation vector $v_d$, of the hearing device based on the detected at least one movement and/or acceleration; and
   determining at least one deviation, at least one deviation angle $\theta$, between the reference orientation or position, the reference vector $u_{ref}$, and the at least one deviating orientation or position, the at least one deviation vector $v_d$.

2. Method according to claim 1, wherein the hearing device comprises at least two input devices, and wherein the reference orientation or position, the reference vector $u_{ref}$, is determined as the movement or acceleration, the movement or acceleration vector $v_{acc}$, measured when the at least two input devices of the hearing device are located in a substantially horizontal plane H or in a plane deviating less than 25 degrees from the horizontal plane H.

3. Method according to claim 1, wherein the deviation angle $\theta$ is determined as the angle between the reference vector $u_{ref}$ and the deviation vector $v_d$:

$$\theta = \mathrm{acos}\frac{u_{ref}^T v_d}{\|u_{ref}\|\|v_d\|}$$

or estimated from the reference vector $u_{ref}$ and the deviation vector $v_d$ without applying the acos-function:

$$\theta = \frac{u_{ref}^T v_d}{\|u_{ref}\|\|v_d\|}.$$

4. Method according to claim 1, wherein the deviation angle $\theta$ is separated in a left-right deviation angle $\theta_{xz}$ and in an up-down deviation angle $\theta_{yz}$, and where the left-right and up-down deviation angles are determined as the angle between the reference vector $u_{ref}$ and their respective deviation vector $v_{d;xz}$, $v_{d;xz}$.

5. Method according to any one of claim 1, wherein a plurality of movements or accelerations of the hearing device are detected, and wherein an average tilt, an average tilt vector $w_{avg}$, of the hearing device is determined based on the plurality of movements or accelerations.

6. Method according to claim 5, wherein the average tilt, the average tilt vector $w_{avg}$, of the hearing device is determined at least partly based on a plurality of deviating orientations or positions, a plurality of deviation vectors $v_d$, determined based on the detected plurality of movements or accelerations of the hearing device.

7. Method according to claim 6, wherein only deviations, deviation angles θ, or deviating orientations or positions, deviation vectors $v_d$, below a threshold value are taken into account for determining the average tilt, the average tilt vector $w_{avg}$.

8. Method according to any one of claim 7, wherein the threshold value depends on the direction in which the hearing device is moved or accelerated.

9. Method according to claim 6, wherein, when the detected movement or acceleration of the hearing device indicates a walking of the hearing device user for an amount of time larger than a threshold, deviations, deviation angles θ, deviating orientations, or positions, deviation vectors $v_d$, are not taken into account for determining the average tilt, the average tilt vector $w_{avg}$.

10. Method according to claim 5, wherein the average tilt, the average tilt vector $w_{avg}$, of the hearing device is determined at least partly based on a plurality of deviations, a plurality of deviation angles θ, between the reference orientation or position, the reference vector $u_{ref}$, and a plurality of deviating orientations or positions, a plurality of deviation vectors $v_d$, determined based on the plurality of movements or accelerations of the hearing device.

11. Method according to claim 10, wherein only deviations, deviation angles θ, below at least 15 degrees are taken into account for determining the average tilt, the average tilt vector $w_{avg}$.

12. Method according to claim 5, wherein the plurality of movements or accelerations of the hearing device are detected continuously.

13. Method according to claim 5, wherein the average tilt vector $w_{avg}(n)$ of a current sample n is determined recursively.

14. Method according to claim 5, wherein the average tilt vector $w_{avg}(n)$ of a current sample n is determined as $$w_{avg}(n) = \begin{cases} w_{avg}(n-1), & \text{if the threshold value is exceeded;} \\ (1-\lambda)w_{avg}(n-1) + \lambda v_d(n), & \text{otherwise} \end{cases},$$

where $0 \leq \lambda \leq 1$ is a coefficient controlling the amount of smoothing and $v_d(n)$ is the currently determined deviation vector.

15. Method according to claim 1, the method further comprising:
controlling or regulating signal processing of the hearing device based on the at least one deviation, at least one deviation angle θ.

16. Method according to claim 15, wherein signal processing of the hearing device is disabled if the deviation, the at least one deviation angle θ, exceeds a threshold value.

17. Method according to claim 1, the method further comprising:
controlling or regulating signal processing, in particular controlling or regulating a microphone location effect (MLE), of the hearing device based on the at least one deviation, at least one deviation angle θ.

18. A hearing device being configured to perform the method according to claim 1.

19. Hearing device according to claim 18, wherein the hearing device comprises at least one sensor for detecting at least one movement or acceleration of the hearing device.

20. Hearing system comprising a first and a second hearing device, the first and second hearing device being configured to perform the method according to claim 1, wherein the hearing system is configured to determine a system deviation angle $\theta_{sys}$ based on an average of the average tilt vectors $w_{avg}(n)$ or of the deviation angles θ of the first and second hearing devices.

* * * * *